(12) United States Patent
Gianrossi et al.

(10) Patent No.: US 10,263,850 B2
(45) Date of Patent: Apr. 16, 2019

(54) NETWORK TESTING DEVICE FOR AUTOMATED TOPOLOGY VALIDATION

(71) Applicant: Amazon Technologies, Inc., Seattle, WA (US)

(72) Inventors: Paolo Gianrossi, Dublin (IE); Kevin Michael Dzierwinski, Seattle, WA (US); Cong Wu, Seattle, WA (US); Jacques Joshua Richard, Edmonds, WA (US); Travis Steven Pepper, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 153 days.

(21) Appl. No.: 15/382,518

(22) Filed: Dec. 16, 2016

(65) Prior Publication Data

US 2017/0104637 A1     Apr. 13, 2017

Related U.S. Application Data

(63) Continuation of application No. 14/541,081, filed on Nov. 13, 2014, now Pat. No. 9,525,598.

(51) Int. Cl.
*H04L 12/24* (2006.01)
*H04L 12/26* (2006.01)

(52) U.S. Cl.
CPC .......... *H04L 41/12* (2013.01); *H04L 43/0847* (2013.01); *H04L 43/50* (2013.01); *H04L 43/10* (2013.01); *Y02D 30/30* (2018.01)

(58) Field of Classification Search
CPC ..................................................... H04L 41/12
See application file for complete search history.

(56) References Cited

U.S. PATENT DOCUMENTS 6,823,479 B1 * 11/2004 McElhaney, Jr. ....... H04L 43/50
    714/4.2
7,441,154 B2 * 10/2008 Klotz ................. G06F 11/2257
    714/39

(Continued)

OTHER PUBLICATIONS

International Organization for Standardization/ International Electrotechnical Commission, "Information technology—Trusted Platform Module—Part 1: Overview," International Standard, ISO/IEC 11889-1(E), May 15, 2009, 20 pages.

(Continued)

*Primary Examiner* — Joseph R Kudirka
(74) *Attorney, Agent, or Firm* — Davis Wright Tremaine LLP

(57) ABSTRACT

A network testing device is provided in order to validate network topology information and test various other attributes of a network. The network testing device may, in response to a command, obtain connection information from a network indicated in the command. The connection information may be compared to network topology information corresponding to the network. The network topology information may indicate which interfaces of a network device should be to be connected to which interfaces of other network devices. The network testing device may then return, in response to the command, a result of the comparison. Furthermore, the network testing device may return result of other network test performed by the network testing device on the network device.

20 Claims, 9 Drawing Sheets

(56) References Cited

U.S. PATENT DOCUMENTS

| | | | |
|---|---|---|---|
| 7,733,795 B2* | 6/2010 | Johnson | H04L 41/145 370/241 |
| 8,531,979 B2 | 9/2013 | Pahl et al. | |
| 8,937,870 B1* | 1/2015 | Callaghan | H04L 1/244 370/248 |
| 9,154,383 B2 | 10/2015 | Manuel-Devadoss et al. | |
| 9,608,874 B2* | 3/2017 | Wong | H04L 41/5009 |
| 2003/0204611 A1 | 10/2003 | McCosh et al. | |
| 2006/0274760 A1* | 12/2006 | Loher | H04M 3/2236 370/395.52 |
| 2014/0258479 A1 | 9/2014 | Tenginakai et al. | |

OTHER PUBLICATIONS

International Organization for Standardization/International Electrotechnical Commission, "Information technology—Trusted Platform Module—Part 2: Design principles," International Standard, ISO/IEC 11889-2(E), May 15, 2009, 152 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 Tpm Structures," Specification Version 1.2, Level 2 Revision 103, Jul. 9, 2007, 198 pages.

Trusted Computing Group, "TPM Main, Part 2 Tpm Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

\* cited by examiner

Topology Information

| Source Host | Source Interface # | Destination Host | Destination Interface # |
|---|---|---|---|
| Source ID #1 | 140 | Destination ID #6 | 22 |
| Source ID #1 | 20 | Destination ID #7 | 80 |
| Source ID #3 | 1 | Destination ID #8 | 14 |
| Source ID #4 | 45 | Destination ID #9 | 46 |
| Source ID #5 | 42 | Destination ID #9 | 105 |

NETWORK TESTING DEVICE FOR AUTOMATED TOPOLOGY VALIDATION

CROSS REFERENCE TO RELATED APPLICATION

This application is a continuation of U.S. patent application Ser. No. 14/541,081, filed Nov. 13, 2014, now U.S. Pat. No. 9,525,598, entitled "NETWORK TESTING DEVICE FOR AUTOMATED TOPOLOGY VALIDATION," the disclosure of which is hereby incorporated herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace; there are private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

The advent of virtualization technologies has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more computer instances hosted by the single physical computing machine, with each such virtual machine being a software simulation acting as a distinct logical computing system that provides users with an experience as if they were the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Operators of networks that enable clients to use hundreds or thousands of virtualized resources within a given data center, or spread over multiple data centers, often set up interconnect topologies that offer multiple parallel physical network paths between a given pair of virtualized resources. However, many conventional networks set up with interconnected topologies may be difficult to test and/or troubleshoot as a result of the plurality of possible failure points. Data centers may have many interconnects devices on a single network, where each device connects to many other devices. A point of failure (e.g., a broken or misplaced cable between the two devices) may be difficult to locate or even detect.

BRIEF DESCRIPTION OF THE DRAWINGS

Various embodiments in accordance with the present disclosure will be described with reference to the drawings, in which:

FIG. 3 illustrates network topology information which may be used by the network testing device during test execution in accordance with an embodiment;

DETAILED DESCRIPTION

Figure 1:
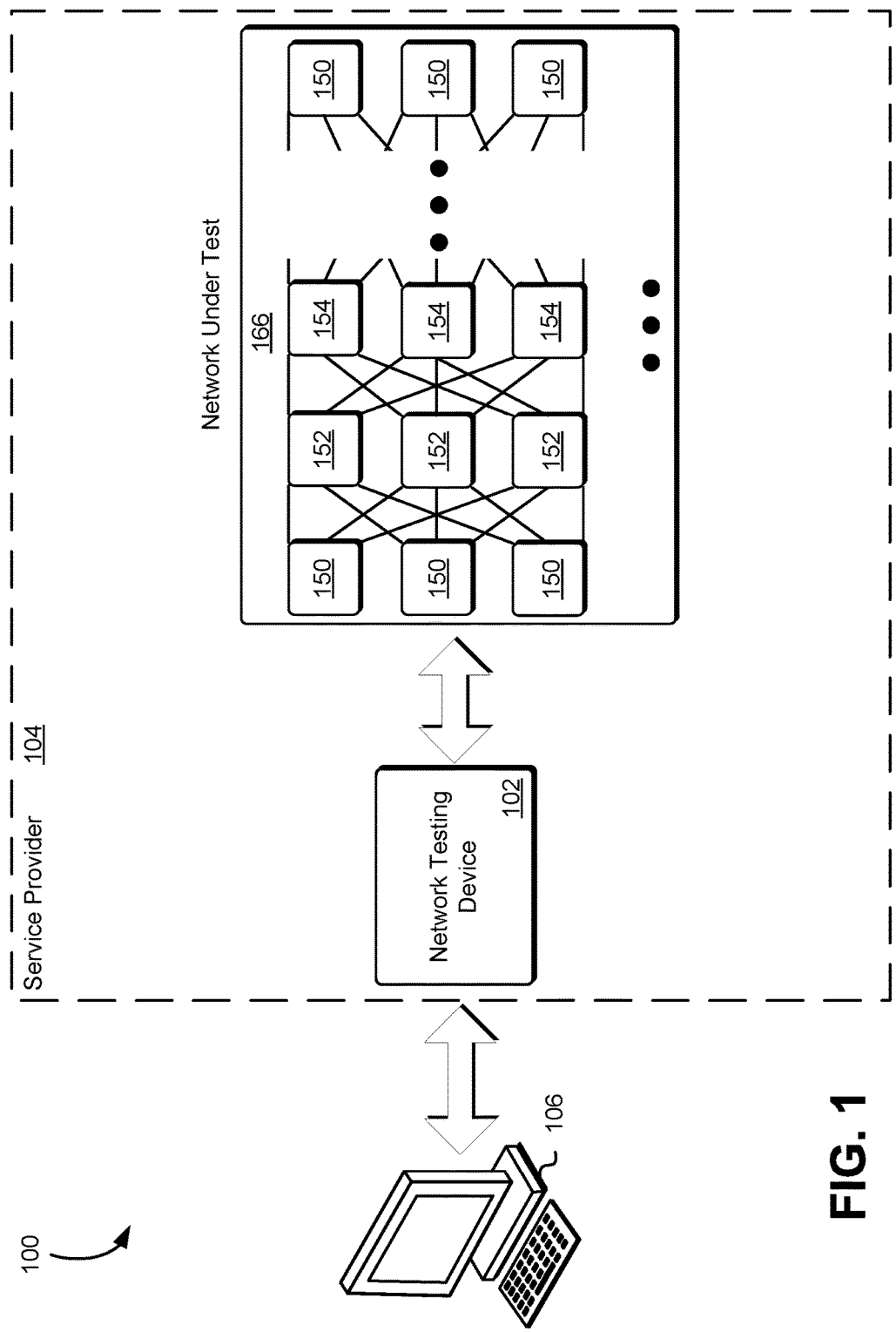
FIG. 1 illustrates a network testing device for network topology validation in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a network testing device configured to validate network topology and verify that network configuration and performance is suitable for use. Furthermore, the network testing device may be used to troubleshoot network issues and detect a variety of problems within a network. The problems or issues may include faulty cabling or wires, broken cabling or wires, cabling or wires connected to an incorrect interface, issues with transceivers or other networking equipment, or other problems with computing devices connected to the network. Network engineers or other employees of an organization may be responsible for installation and maintenance of the organizations physical networking devices. For example, a group of network engineers may be responsible for connecting computing device of the organization in a particular manner (e.g., a first interface of a first device to a second interface of a second device). The connections may be fiber optic or other physical cabling between switches and other networking devices used to connect computing devices in a data center to one another and to computing devices connected to one or more networks external to the data center. The computing devices in the data center may be connected in a dense, multi-layer, multi-path interconnected network, such as a Clos Network. The dense, multi-layer, multi-path interconnected network, described in greater details below, may include a plurality of computing devices with many interfaces connected to a plurality of other computing devices. Validation and testing of the plurality of connections between computing devices may be difficult and time consuming. The network testing device described herein may provide an automated process for validating the plurality of connections and detecting problems with a network.

Using the network testing device, an organization may attempt to valid the connections made by the network engineers. The network testing device may connect to one or more switches included in the interconnected network. The network testing device may then execute a series of commands on the one or more switches, the commands may be configured to retrieve various information from the switches. For example, the network testing device may execute a Link Layer Discovery Protocol (LLDP) command to retrieve information from a particular switch. The LLDP information may include identity, capability and neighbor information of the local area network to which the switch is connected to. The network testing device may obtain a variety of information from computing devices connected to the network such as, neighbor information, signal strength, and validity of the connection. These connections and tests may be executed in parallel by the network testing device. Furthermore, the network testing device may include an interface configured to enable network engineers or other employees of the organization to execute and obtain testing results from a single location. For example, the network testing device may include a management console exposed as a webpage and configured to execute commands received at the webpage.

Once the network testing device has obtained information from the computing devices connected to the network, the information may then be compared to the expected output as defined by a network topology provided as an input to the system or automatically determined from some input. For example, a description of the network topology, described in greater detail below, may be provided to the network engineers in order to connect the computing devices of the network and later provided to the network testing device so that the network testing device may compare the obtained information to the expected network topology. In another example, the network topology may be determined based at least in part on information corresponding to the network, such as the type of network or type of computing devices under test. Adherence to the prescribed standards and thresholds is communicated to the network engineer by either a user interface feedback describing, if any, the issues or errors detected, or by generating a validation summary document containing the information. The networking testing device may enable verification of optical fibers and optical transceivers used to connect computing devices of the network are not damaged, dirty, or otherwise responsible for traffic loss.

FIG. 1 illustrates an environment 100 in which a computing resource service provider 104 may operate a network testing device 102 capable of validating network topology and generally perform test operations on a network in at least some embodiments. The computing resource service provider 104 may provide a variety of services to a testing entity 106 and the testing entity 106 may communicate with the computing resource service provider 104 via an interface, described in greater detail below in connection with FIG. 2, which may be a web services interface or any other type of interface. The testing entity 106 may utilize a computer system provided by an organization in order to validate and/or test one or more networks of the service provider 104. The testing entity 106 may include employees of the organization or the service provider 104, such as a network engineer, responsible for maintaining the one or more networks of the service provider 104. For example, the testing entity 106 may be a network engineer or employee of the organization responsible to set up and testing of various networks. As shown in FIG. 1, the testing entity 106 may communicate via a computer system with the computing resource service provider 104 and the network testing device 102 in order to execute tested of a network under test 166.

The network testing device 102 may be a computer system or other collection of computing resources (e.g., network of computer systems) configured to connect to various computing devices of the network under test 166, perform various test operations, and compare the obtained test results to expected results. The network under test 166 may be a dense, multi-path, multi-layer internal interconnected network 166 that includes a plurality of different physical paths between computing devices connected and/or included in the network under test 166. The physical paths may be cables, such as fiber optic cables, or other connections between interfaces of the computing devices connected and/or included in the network under test 166. As illustrated in FIG. 1, the network under tests 166 is shown as comprising a number of distinct layers, including outer layers comprising interconnect nodes 150, and inner layers comprising a different class of interconnect nodes 152 and 154. The outer layer nodes 150 may differ from the inner layer nodes 152 and 154, such as the physical arrangement of the nodes, the number of nodes per rack, the number of distinct in and/or out interfaces at each node, the performance capabilities of the physical links leading into and/or out of the nodes, and so on.

The nodes 150, 152, and 154 may comprise a variety of different computing devices including routers, switches, hubs, network bridges, or other computing devices suitable for using in a network. The nodes 150, 152, and 154 may contain one or more interfaces, such as ports, which may be connected to an interface of another node. In various embodiments, the interfaces of the nodes 150, 152, and 154 are connected in a predefined pattern or topology determined based at least in part on networking requirements. The topology information may be maintained in an authoritative data store accessible to the network testing device 102. The topology information, described in greater detail below, may be used by the network engineers to connect cables between the interfaces of the nodes 150, 152, and 154 indicated in the topology information. Furthermore, the network testing device 102 may use the topology information to validate the test result obtained from the nodes 150, 152, and 154.

The testing entity 106 may connect to an interface of the network testing device 102, the interface may be configured to enable the testing entity 106 to perform various testing operations and obtain test results. The testing entity 106 may be a network engineer as described above, responsible to connecting the interfaces of the nodes 150, 152, and 154. The testing entity's 106 interactions with the interface of the network testing device 102 may cause the network testing device 102 to connect to various nodes and obtain test results indicated by the testing entity's 106 interactions with the interface. For example, the networking device 102 may connect to node 150 and obtain information corresponding to the set of interconnections between the node 150 and all other computing devices connected to node 150. The obtain information from node 150 may then be compared to an expected result and if a difference is detected an exception may be returned to the testing entity 106. For example, the network testing device 102 may obtain information indicating that node 150 is connected to node 152 on port 1, the network testing device 102 may then determine that node 150 should be connected to node 152 through port 3. As a result of the determination, the network testing device 102 may return to the testing entity 106 an indication that the node 150 is connected to node 152 through an incorrect port. This information may enable the testing entity 106 to alter the network under test 166 and connect node 150 to node 152 through port 3.

Figure 2:
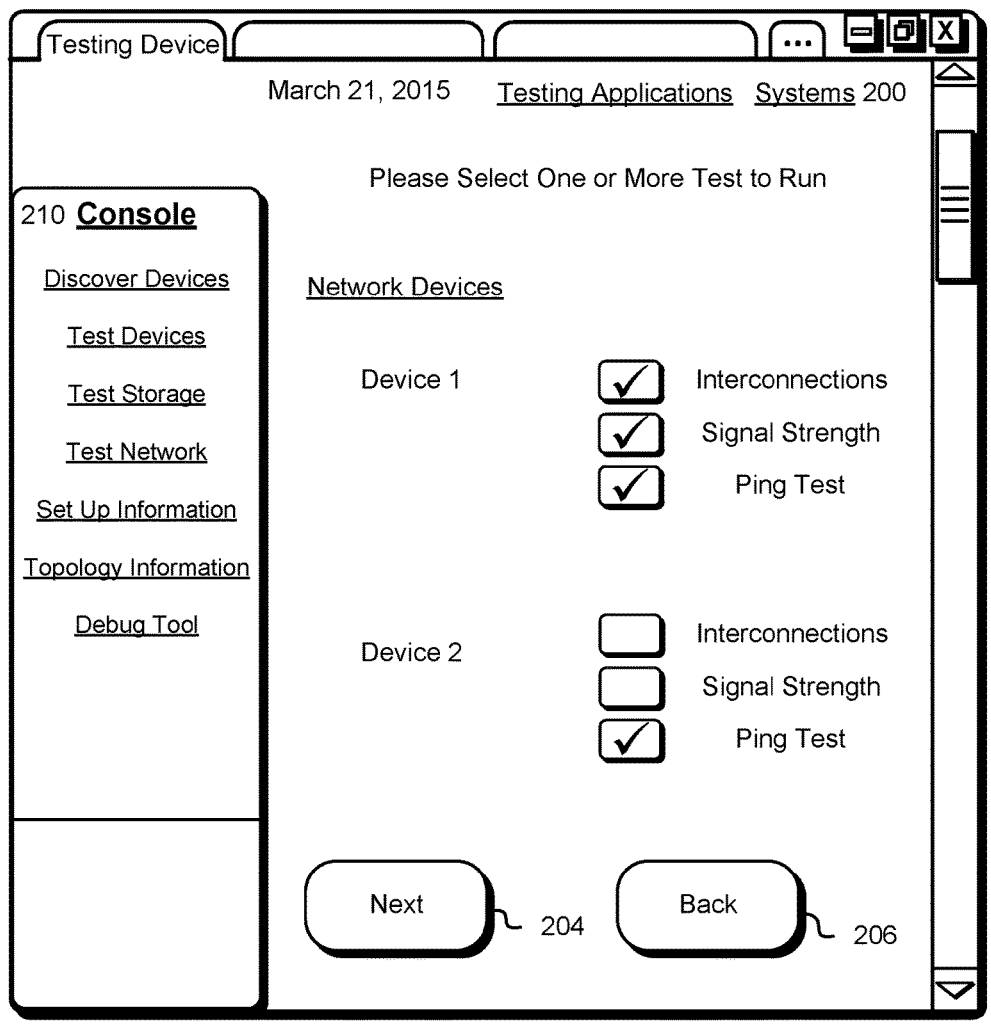
FIG. 2 illustrates a management console for the network testing device exposed to users as a webpage in accordance with an embodiment.

As illustrated in FIG. 2, the webpage 200 includes various graphical user interface elements that enable testing entities to perform network topology validation and network testing through an interface of a network testing device of which the webpage 200 is a part. The webpage 200 may be displayed by various applications, such as a mobile application or a web browser. In this example, the webpage 200 includes various navigational features. For instance, on the left-hand side of the webpage 200, various links 210 may link to one or more other webpages that contain additional content corresponding to a variety of different actions the testing entity may cause to be performed. The console pages may correspond to operations that may be taken to manage or otherwise control the network testing device. In this example, the links appear as textual words which enable the links to be selected using an appropriate input device such as a keyboard, mouse, touchscreen, or other input device. Selection of one of the links 210 may cause an application displaying the webpage 200 to submit, pursuant to a URL associated with the selected link by the programming of the webpage 200, an HTTP request for the content associated with the link to a server that provided the webpage 200 or another server.

In this example, the webpage 200 also includes a graphical user interface element configured as a "next" button 204. The next button 204 may be a graphical user interface element of the webpage 200 where the underlying code of the webpage 200 is configured such that selection by an input device of the next button 204 causes information corresponding to the selection of a computing device to test and test operations to perform on the selected computing device on the webpage 200 to be transmitted to one or more servers of the service provider, such as the servers responsible for executing the network testing device. Through the interface, the testing entity may be guided through the process of validation network topology and/or performing various tests of the network. The process may be divided into steps and the testing entity may be prompted to provide information at each step. For example, the webpage 200 displays to the testing entity a list of different devices, where at least a portion of the devices may be tested by the network testing device. The testing entity, using an input device, may select various devices and tests to perform. The testing entity selection may be stored until the entire process is completed or the testing entity selection may be transmitted to the network testing device upon selection of the next button 204. For example, the user may select from a set of tests including a connection test, a signal strength test, and an error rate test as described herein. The connection test may return information indicating connections between various interfaces of network devices included in the network under test. The signal strength test may return information indicating a measured magnitude of a signal received at a network device. The error rate test may return information indicating the number of bit errors of received bits of a data stream over a physical link that may have been altered due to noise, interference, distortion, or bit synchronization errors. Although interconnections, signal strength, and ping test are shown in FIG. 2, the testing entity may be prompted to select additional tests or other information, such as network topology information useable by the network testing device to validate the information obtained from the computing devices connected to the network.

The webpage 200 may also include a graphical user element configured as a "back" button 206. The back button 206 may be a graphical user interface element of the webpage 200 where the underlying code of the webpage 200 causes the application displaying the webpage 200 to navigate to a previously navigated webpage. Once the testing entity has made a selection using the webpage 200 and selected the next button 204, the application displaying the webpage 200 may submit an HTTP request to the network testing device to perform the operations selected by the testing entity. The request may be transmitted to one or more servers or services of the service provider. For example, the request may be transmitted to the network testing device operated by the service provider. The network testing device may then determine, based at least in part on the testing entity's selection, a computing device of the network under test to connect to and execute the selected operations. Furthermore, the network testing device may connect to a plurality of computing devices of the network under test in parallel. Once connected the network testing device may executed a variety of commands in order to obtain information suitable for validating the network under test. The connection between the network testing device and the computing device of the network under test may include any suitable network connection or remote connection for communicating commands to a computing device, such as an Secure Sockets Layer (SSL) or Secure Shell (SSH) connection. The remote connection may be made with intermediary devices (e.g., after performing a handshake process of a handshake protocol). The commands provided by the network testing device to the computing device of the network under test may cause the computing device to return information corresponding the computing device, such as a set of other computing devices and ports to which the computing device is connected to, the signal strength of each connection of the set of connections to the other computing devices, or an amount of packet loss or signal degradation along the connections to the other computing devices.

FIG. 3 illustrates an example of network topology information 300 useable in validating network topology of a network under tests in at least some embodiments. The topology information 300, in various embodiments, contains source host name, source interface information, destination host name, and destination interface information. Furthermore, the topology information 300 may indicate physical links between computing devices of a network. For example, the topology information 300 may indicate that a particular source host is physically connected to a particular destination host between a particular interface of the source host and a particular interface of the particular destination host. As illustrated in FIG. 3, source host "Source ID#1" is physically connected through source interface "140" to destination host "Destination ID#6" through destination interface "22." The source host name and destination host name may correspond to Domain Name System (DNS) names for the corresponding computing devices. This may enable the network testing device, described above, to locate and connect to computing devices of the network under test as well as validate that network topology.

The topology information 300 may be a set of records indicating how computing devices of a network may be interconnected. The topology information 300 may be a set of records, as illustrated in FIG. 3, indication physical links or interconnections between particular computing devices of the network. The topology information 300 may be generated using a variety of different mechanisms. For example, a network engineer may determine which computing device to connect to other computing devices at which port and may store this information in the topology information 300. In another example, the network testing device may determine the topology information 300 by connecting to various computing devices connected to the network and obtaining information about the physical links connected to the computing devices. In yet another example, the network testing device may determine the network topology based at least in part on one or more attributed of the network under test, such as the type of computing devices connected to and/or by the network.

Figure 4:
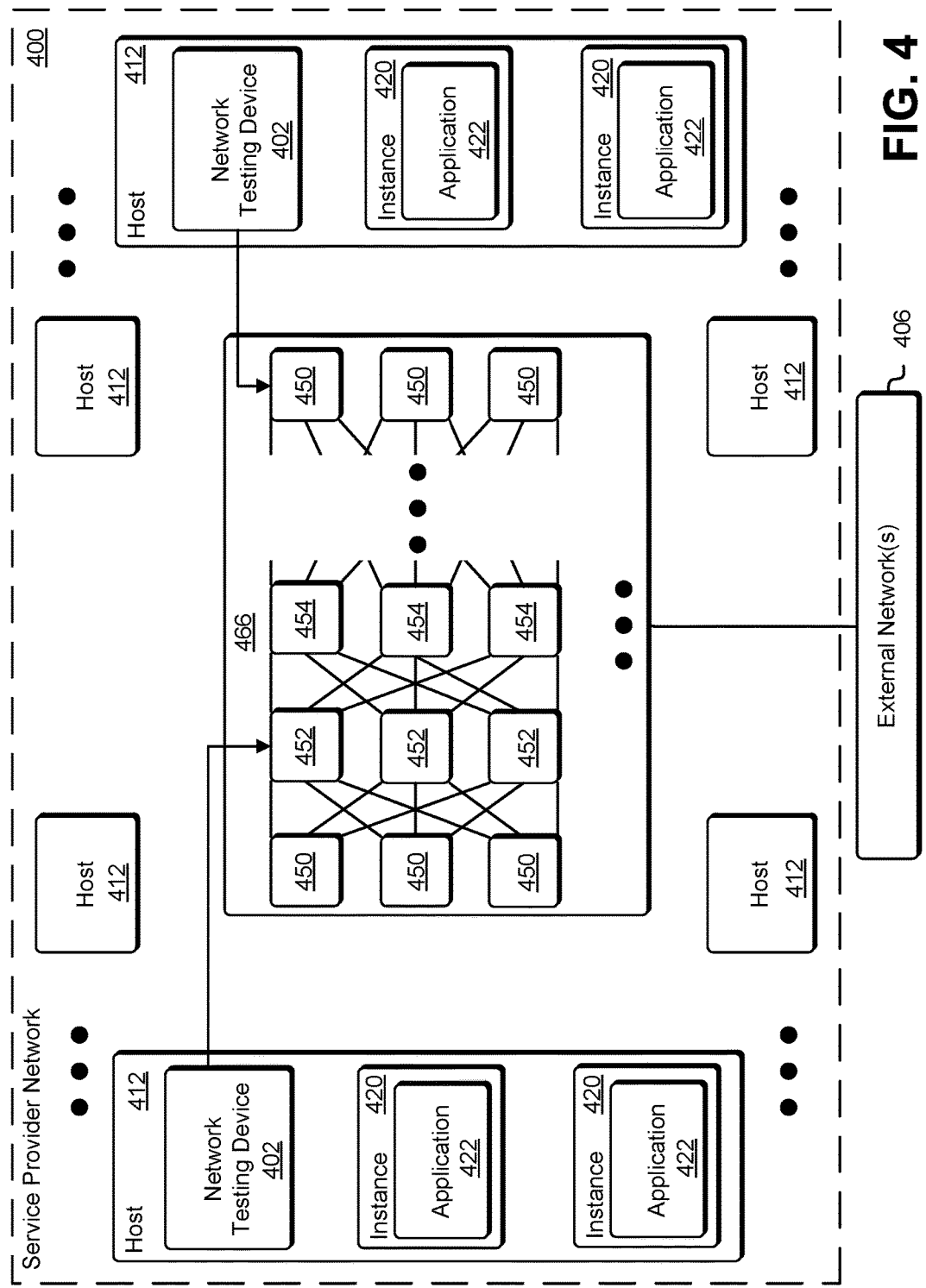
FIG. 4 illustrates an example of a system in which network testing device of a service provider network is linked to a dense, multi-layer, multi-path interconnected network for testing purposes in accordance with an embodiment.

FIG. 4 illustrates an example of a service provider network 400 in which physical hosts of the service provider network 400 are linked by a dense, multi-layer, multi-path interconnected network 466, according to at least some embodiments. As shown, the service provider network 400 comprises a plurality of hosts 412 used for implementing various computer systems. For example, the physical host may be used to implement virtual computer instances 420, as illustrated by FIG. 4, the virtual computer instances may be offered to customers of the computing resource service provider. Customers of the computing resource service provider may use the virtual computer instances 420 to execute applications 422 on behalf of the customers. The service provider network 400 may enable communication between virtual computer instance 420 operated by customers. Furthermore, the computing resource service provider may use the physical hosts 412 to implement computer systems used by the computing resource service provider, such as a network testing device 402.

The hosts 412 may include any of the computing devices, processes, hardware modules, or software modules that are owned by, managed by, or allocated to, an entity (such as an organization, a group with multiple users, or a single user) that is capable of accessing and utilizing at least one network-accessible service of the service provider network 400, such as the physical hosts described above. A given service provider network 400 may include numerous data centers (which may be distributed across different geographical regions) hosting various resource pools, such as collections of physical and/or virtualized computer servers, storage servers with one or more storage devices each, networking equipment and the like, needed to implement, configure, and distribute the infrastructure and services offered by the provider. A number of different hardware and/or software components, some of which may be instantiated or executed at different data centers or in different geographical regions, may collectively be used to implement each of the services in various embodiments. Testing entities may interact with resources and services at the provider network 400 from devices located at a remote premises or data centers external to the provider network.

As shown, at least some subset of the hosts 412 may be linked via a dense, multi-path, multi-layer internal interconnected network 466 that includes a plurality of different physical paths between pairs of hosts 412. As illustrated in FIG. 4, the dense interconnected network 466 is shown as comprising a number of distinct layers, including outer layers (i.e., layers directly connected to hosts 412) comprising interconnect nodes 450, and inner layers (not directly connected to hosts 412) comprising a different class of interconnect nodes 452 and 454. The outer layer nodes 450 may differ from the inner layer nodes 452 and 454, such as the physical arrangement of the nodes (e.g., outer layer nodes 450 may be arranged in racks physically close to the racks at which hosts 412 are housed), the number of nodes per rack, the number of distinct in and/or out ports at each node, the performance capabilities (e.g., bandwidth and/or latency) of the physical links leading into and/or out of the nodes, and so on. In some embodiments, the outer layer nodes are referred to as "bricks," and the inner layers are referred to collectively as a "fabric." In other embodiments, nodes used for various interconnected layers may have similar capabilities (e.g., each of the nodes of the interconnected network 466 may be identical). Various different types of topologies may be used for the dense interconnect in different embodiments, such as fat trees, VL2 topologies, BCubes, high radix network fabric topologies, or various other types of topologies based on Clos networks. The interconnected nodes 450, 452, and/or 454 may comprise, for example, switches (e.g., intelligent switches equipped with routing functionality), routers, and/or various other types of networking devices in different embodiments. In at least some embodiments, the interconnected nodes 450, 452, and/or 454 may comprise inexpensive commodity hardware and/or software components.

As illustrated in FIG. 4, at least a subset of the hosts 412 may comprise a representative network testing device 402. The network testing device 402 may be configured to communication with the interconnected nodes 450, 452, and/or 454 using one or more network protocols such as TCP, UDP and IP protocols of the Internet suite or the LLDP protocol, Open Shortest Path First (OSPF) protocol, or any other suitable networking protocol for communicating with computing devices connected to a network. The network testing device 402 may communicate directly with the interconnected nodes 450, 452, and/or 454 directly or through a component of the host 412 such as a network interface. In various embodiments, the network testing device is a set of application component or executable code configured to perform various testing operations in response to input from a user, such as a network engineer as described above. Furthermore, the network testing device 402 may be configured to utilize other computing resources or services provided by the computing resource service provider. For example, the network testing device 402 may utilize a data storage service or notification service of the computing resource service provider.

Figure 5:
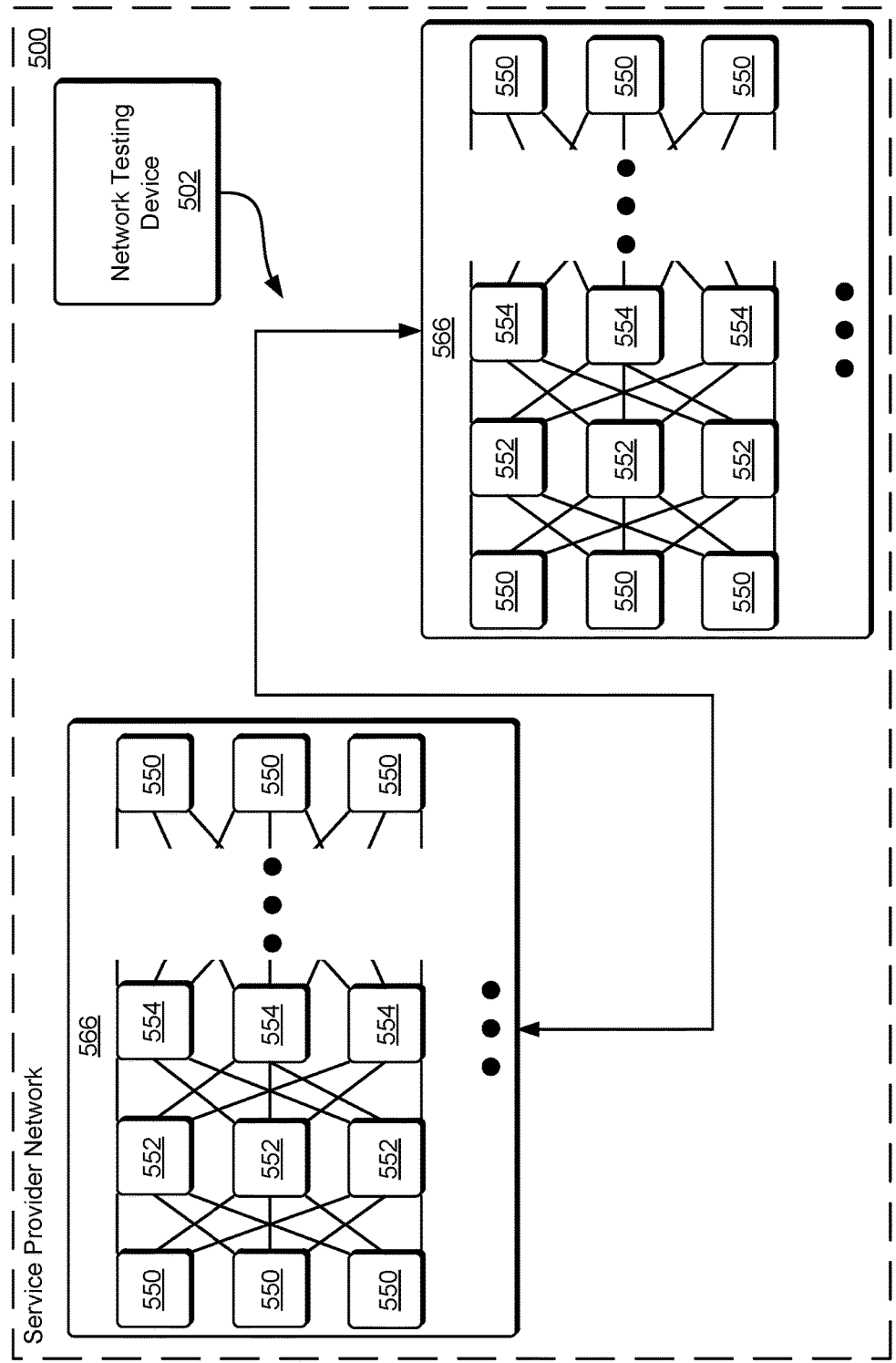
FIG. 5 illustrates an example of a system in which network testing device of a service provider network is linked to a plurality of dense, multi-layer, multi-path interconnected network for testing purposes in accordance with an embodiment.

FIG. 5 illustrates an example of a service provider network 500 in which the service provider network 500 comprises a plurality of linked by a dense, multi-layer, multi-path interconnected networks 566, according to at least some embodiments. As shown, the service provider network 500 further comprises a network testing device 502 and a connection between at least two interconnected networks 566. As described above, the network testing device 502 may be a computing device configured to connect to computing devices of the dense interconnected network 566. The dense interconnected network 566 is shown as comprising a number of distinct layers, including outer layers comprising interconnect nodes 550, and inner layers comprising a different class of interconnect nodes 552 and 554. The outer layer nodes 550 may differ from the inner layer nodes 552 and 554, such as the physical arrangement of the nodes, the number of nodes per rack, the number of distinct in and/or out ports at each node, the performance capabilities of the physical links leading into and/or out of the nodes, and so on. As illustrated by FIG. 5, the interconnected network 566 may include a physical link or cable between two or more other interconnected networks 566. The network testing device 502 may be configured to test various aspects of the physical link between the interconnected networks 566.

Figure 6:
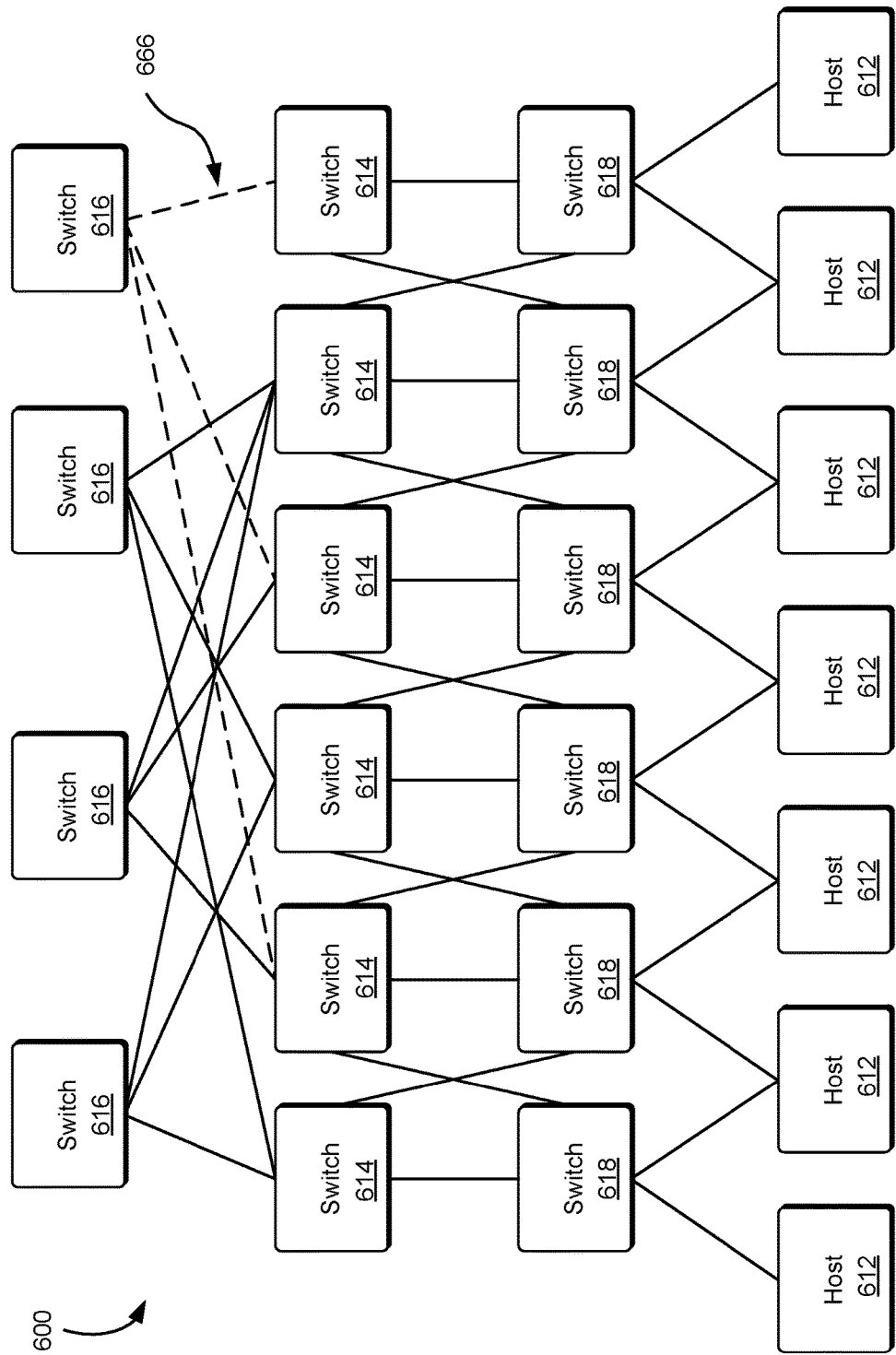
FIG. 6 illustrates an example of a system in which a plurality of connections between computing devices of a network are tested by a network testing device in accordance with an embodiment.

As described above, a number of different types of dense, multi-path interconnected network topologies may be used in different embodiments, including fat trees, VL2 topologies, BCube topologies, and the like. By way of example, FIG. 6 illustrates a system 600 in which network topology validation and network testing may be performed between a pair of switches connected by a physical link 666, according to at least some embodiments. In the depicted embodiment, hosts 612 are each linked to a first layer or "Tier-1" of switches 618. Switches 618 of the first layer are each linked to two hosts 612 and to two second-layer ("Tier-2") switches 614. Each second-layer switch 614 is in turn linked to two third-layer ("Tier-3") switches 616. Each third-layer switch 616 may be linked to three different second-layer switches 614. It is noted that, for clarity, FIG. 6 shows a much-simplified example, and that in many practical large-scale implementations the link fan-out between different switch layers (e.g., 618, 614, and/or 616) and/or between the switches and the hosts 612 may be much higher than that shown in FIG. 6; the number of layers or tiers may also be higher. Each of the links shown in FIG. 6 may support bandwidths of several gigabits/second (e.g., 10 Gbits/second).

Several different physical links are used to connected hosts 612 and switches as illustrated in FIG. 6. One such switch 616 may be subject various networking test and other operations performed by the network testing device. As illustrated in FIG. 6 as a dashed line between the switch 616 and other switches may be physical links under test by the network testing device. The network testing device may validate the physical links which are connected to the indicated switches and indicated interfaces of the switches. The switches and interfaces that are connected to the switch 616 may be indicated by the topology information described above. Furthermore, the network testing device may obtain signal strength information from the switch 616, the signal strength information may be obtained at the interface of the switch 616 and may indicate magnitude of the signal received from another switch. For example, the network testing device may obtain information indicating the light level received and the switch 616. The network testing device may also execute a ping test or other network transmission test from the switch 616. Furthermore, as the number of layers and/or the link fan-out increases, many more physical links may be possible between a given pair of computing devices connected via such dense interconnected networks. In at least some embodiments, at least some of the interconnect nodes such as Tier-1, Tier-2, or Tier-3 switches 618, 614, or 616 may be tested in parallel by the network testing device.

Figure 7:
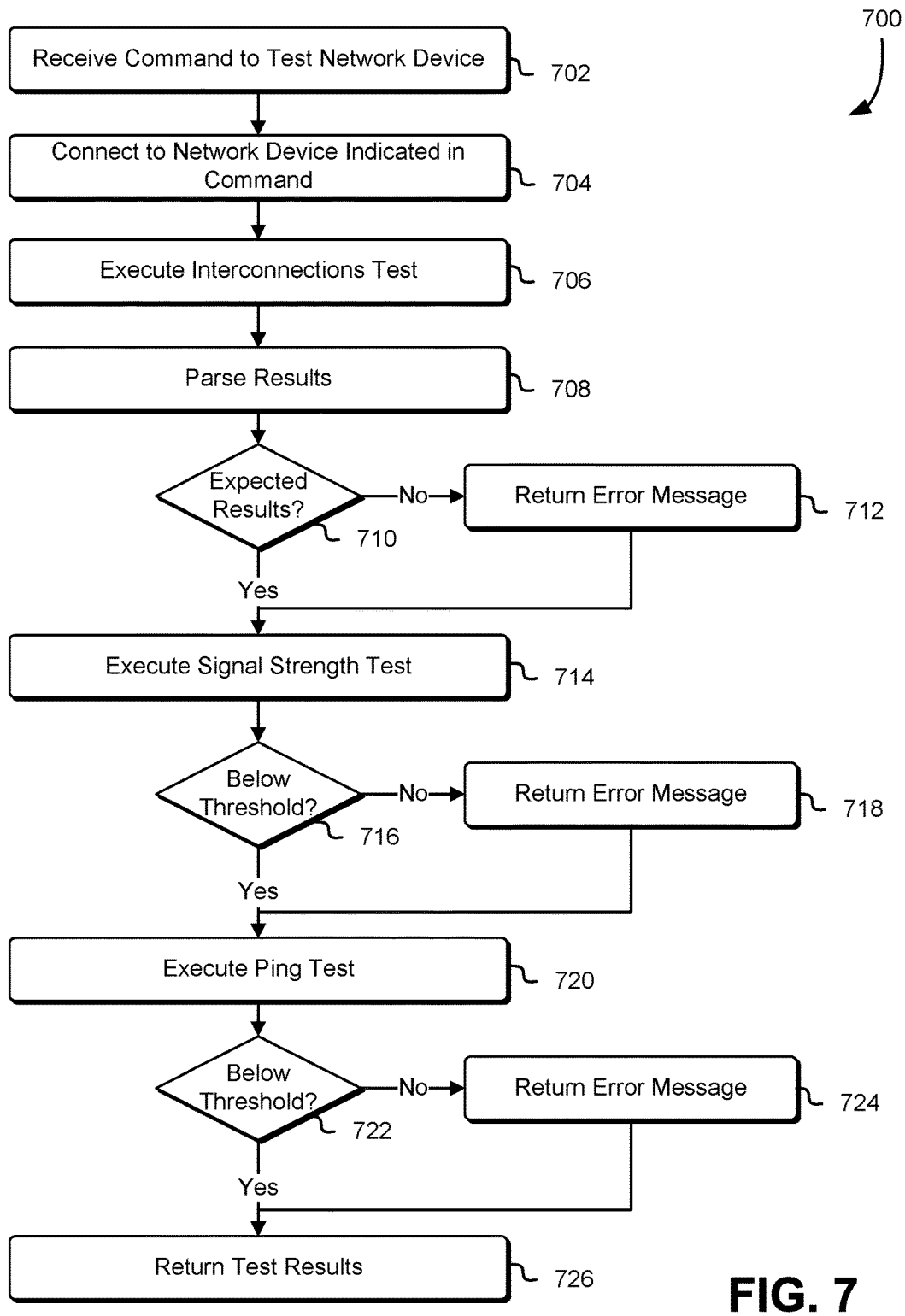
FIG. 7 illustrates an example process for performing network topology validation and testing using a network testing device in accordance with an embodiment.

FIG. 7 shows an illustrative example of a process 700 which may be used to perform various network validation and testing operations. The process 700 may be performed by any suitable system or combination of systems such as the network testing device described above in connection with FIG. 1. Returning to FIG. 7, in an embodiment, the process 700 includes receiving a command to test a network device 702. The network device may include routers, switches, hubs, network bridges, or other computing devices suitable for using in a network. Furthermore, the network device may be connected to a dense interconnected network as described above. The network device may also be connected through a physical link to at least one other computing device. The received command may be an application programming interface (API) or remote procedure call (RPC) configured to cause the network testing device to perform the various tests. The command may indicate a particular network device to test or a particular network and may indicate particular test to perform. The network testing device may then connect to the network device indicated in the command 704. As described above, the network testing device may connect to the network device using an SSH connection or other suitable connect for communicating with the network device.

The network testing device may then execute an interconnections test 706 on the network device. The network testing device may execute the test by transmitting a command over the connection to the network device. The transmitted command may indicate a set of interfaces to test and information to return in response to the command. For example, the command may cause the network device to return information corresponding to the physical links between interfaces of the network device an all other device connected to the network device. The network device may then return the information, indicated in the transmitted command, to the network testing device. The network testing device may then parse the results 708. For example, the network testing device may extract topology information from the return results as described above in connection with FIG. 3. The information once parsed may indicated which interfaces of the network device are connected to which other interfaces of other devices.

The parsed results may then be compared to expected results 710. The expected results may be determined by the network testing device based on one or more attributes of the network as described above. Furthermore, the expected results may be obtained from a repository containing network topology information which specifies the expected results (e.g., by specifying topological information against which the parsed results may be checked for consistency with). The expected results may indicate a topology and/or constraints on a topology against which the parsed results can be checked. The repository may be maintained by an organization responsible for the network, such as the computing resource service provider described above. Furthermore, the network topology information contained repository may be generated by network engineers and utilized to setup or install the network and/or network device under test, as described above. A system performing the process 700 may determine 710 that the parsed results match the expected results as a result of a network topology indicated by the parsed results matching a network topology indicated by the expected results and/or as a result of the parsed results indicating compliance with any topological constraints. For example, the parsed results may include a set of records containing a source host, a source interface, a destination host, and a destination interface, as described above in connection with FIG. 3. Furthermore, the obtained network topology information may include a set of records formatted as illustrated in FIG. 3, the network testing device may then compare parsed results with the obtained network topology information to determine if the results are expected. If the results are not expected, the network testing device may return and error message 712. The interface, described above in connation with FIG. 2, may be configured to provide the error message to a user of the network testing device. For example, the interface can be used to configure topics for which user seeks to receive notifications, subscribe users to the topics, publish messages, or configure delivery of the messages over the users' protocol of choice (i.e., hypertext transfer protocol (HTTP), e-mail, and short message service (SMS), among others). The error message may be provided to users using a "push" mechanism without the need to check periodically check or "poll" for new information and updates. Additionally, if the parsed results matched the expected results a notification may be provided to the user, indicating that the network topology is valid and/or expected.

The network testing device may then execute a signal strength test 714. As described above, the network testing device may transmit a command to the network device, the command may cause the network device to execute the test indicated in the command. For example, the command may be a show light levels command for the network device. The network device may then return information indicating the signal strength corresponding to the signal received at various interface of the network device. The network testing device may then determine if the returned signal strength is below a threshold 716. The threshold may be determined by a manufacture of the network device, an attribute of the network device, a requirement of the network device, a network engineer, or other suitable source for determine networking requirements. If the signal strength is below the threshold, the network testing device may return an error message 718 to the user, as described above. Similarly, if the signal strength is not below the threshold, the network testing device may return a notification to the user indicating that the signal strength is above the threshold.

The network testing device may then execute a ping test 720. As described above, the network testing device may cause the network device to execute the ping test by transmitting a command to the network device. The ping test may be configured to generate some amount of traffic between an interface of the network device and another device (e.g., transmit traffic across a physical link between the network device and the other device). The network testing device or network device may then check that there are no errors in the traffic transmitted between the network device and the other device. For example, ping data transmitted between the two devices may be check by performing errors tests on both sides of the connection, such as cyclic redundancy check (CRC) error checking. The network testing device may then determine if the amount of errors detected is below the threshold 722. If the amount of errors detected is above the threshold, the network testing device may return an error message 724 as described above. The network testing device may then return the results of the test 726. In numerous variations to the process 700, the network testing device may execute fewer test then described in the process 700 or may execute the test in parallel. Furthermore, network testing devices may return result at various points during execution of the process 700.

Figure 8:
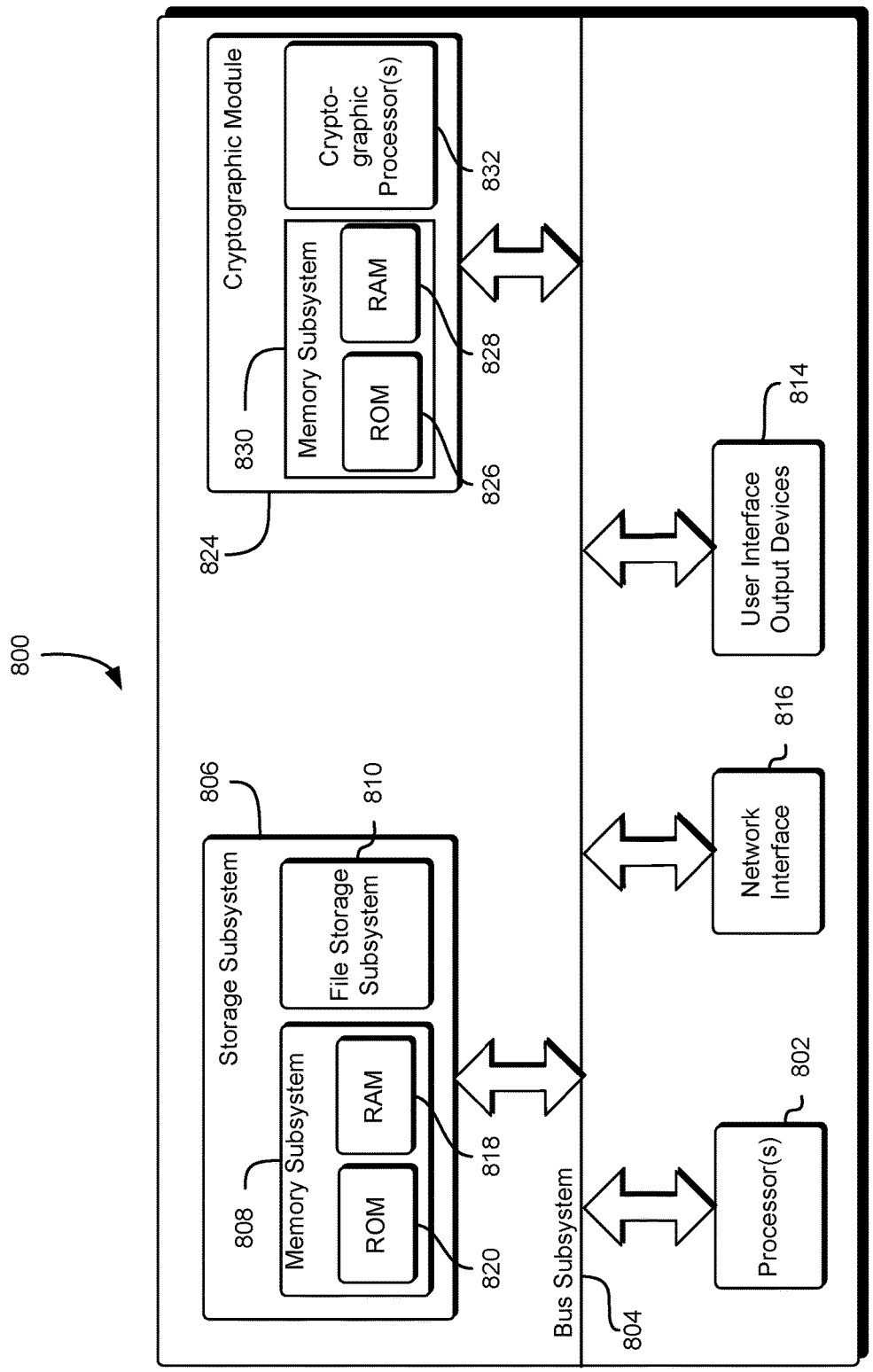
FIG. 8 shows an illustrative example of components of a network testing device in accordance with one embodiment.

FIG. 8 is an illustrative, simplified block diagram of an example device 800 that may be used to practice at least one embodiment of the present disclosure. In various embodiments, the device 800 may be used to implement any of the systems illustrated herein and described above. For example, the device 800 may be used to implement a network testing device, in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface output devices 814, a network interface subsystem 816, a cryptographic module 824, comprising a memory subsystem 830, and one or more cryptographic processors 832.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the device system 800. For example, the network interface subsystem 816 may enable transmission of authentication objects and other information, such as electronic requests to access a system (e.g., receive a webpage) and may enable receipt of responses to the requests, such as webpages or other information. The network interface subsystem 816 may also facilitate the receipt and/or transmission of data on other networks, such as an organizations intranet and/or other networks described below.

User interface output devices 814, if any, may include a display subsystem or non-visual displays, such as audio and/or tactile output devices, etc. Generally, the output devices 814 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate, such as presenting the user with authentication information used during a pairing operation. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810. The memory subsystem 808 may include a number of memories including a main random access memory (RAM) 818 for storage of instructions and data during program execution and a read only memory (ROM) 820 in which fixed instructions may be stored.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2, or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for authentication objects.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs, and/or other devices whose physical characteristics encode information usable as or for a hardware secret.

Figure 9:
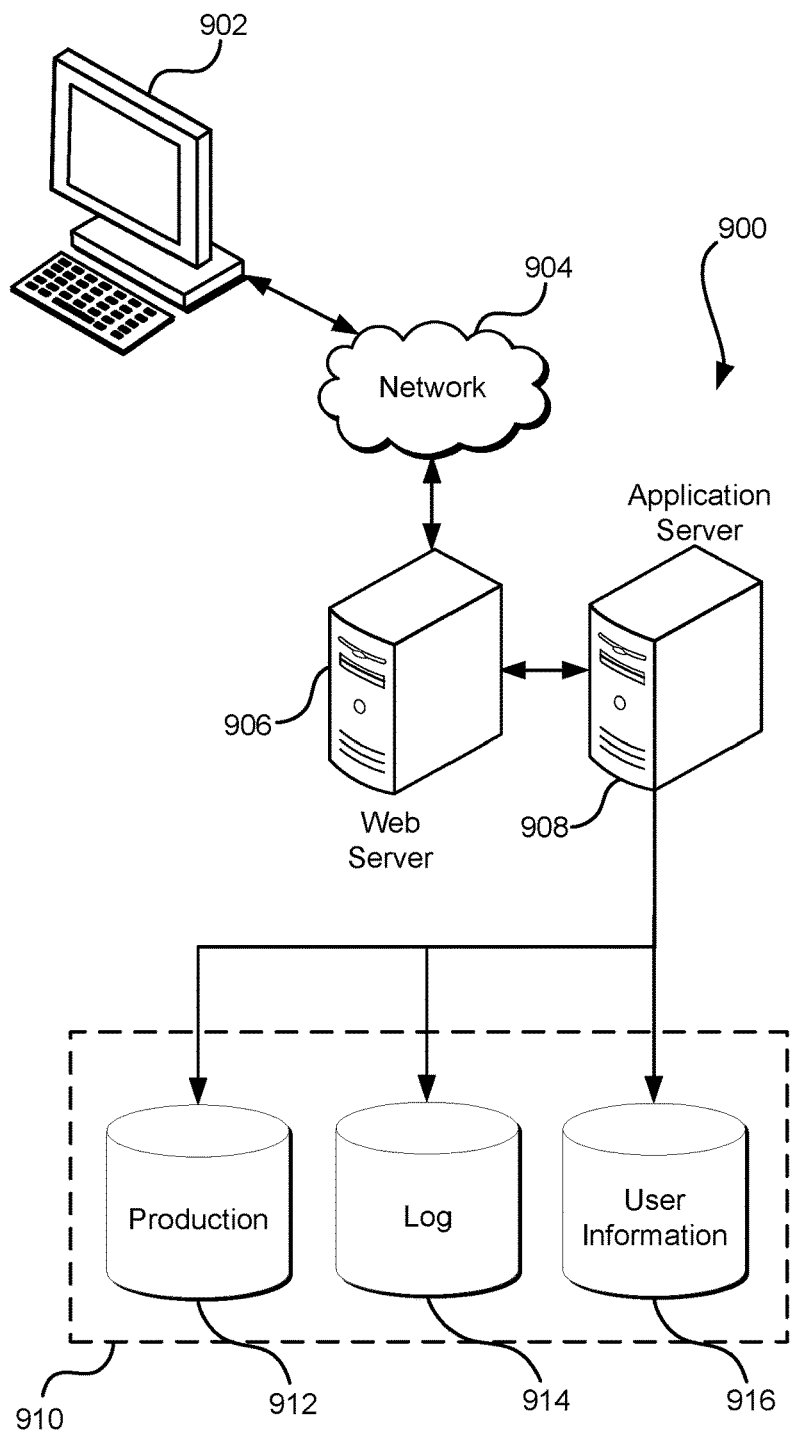
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a request to determine a network topology associated with a plurality of network devices, at least two network devices of the plurality of network devices connected by a plurality of paths;
    providing a command to the at least two network devices to execute a signal strength test;
    obtaining results of the signal strength test comprising information that indicates a respective signal strength of a respective path of the plurality of paths connecting the at least two network devices;
    determining the network topology based at least in part on:
        the information indicating the respective signal strength of the respective path of the plurality of paths connecting the at least two network devices; and
        neighbor information, the neighbor information obtained from the at least two network devices and indicating the plurality of network connections between the at least two network devices; and
    providing a response to the request indicating the network topology.

2. The computer-implemented method of claim 1, wherein:
    the computer-implemented method further comprises obtaining network topology information indicating a source host, a source interface, a destination host, and a destination interface for executing the signal strength test; and
    providing the command to execute the signal strength test further comprises providing the command based at least in part on the source host, the source interface, the destination host, and the destination interface.

3. The computer-implemented method of claim 1, wherein:
    the computer-implemented method further comprises determining that a signal strength associated with at least one path of the plurality of paths is above a threshold based at least in part on the result of the signal strength test; and
    the response further comprises an indication that the signal strength is above the threshold.

4. The computer-implemented method of claim 1, wherein the plurality of paths further comprise a Clos network.

5. A system, comprising:
    one or more processors; and
    memory with instructions that, as a result of being executed by the one or more processors, cause the system to:
        obtain network topology information for a network including a plurality of network devices, the network topology information based at least in part on neighbor information, the neighbor information obtained from the plurality of network devices and indicating a plurality of network paths between the at least two network devices;
        determine at least one test from a group of network tests;
        provide a command to the at least two network devices to execute the at least one test;
        obtain a result of the at least one test of the group of network tests; and
        validate the network topology of the network based at least in part on the result.

6. The system of claim 5, wherein the group of network tests further comprises a signal strength test, an interconnection test, ping tests, and an error rate test.

7. The system of claim 5, wherein the group of network tests further comprises an interconnection test that comprises obtaining connection information from the at least two network devices indicating network interfaces of the at least two network devices and a plurality of other network interfaces connected to the at least two network devices, the plurality of other network interfaces associated with other network devices of the plurality of network devices.

8. The system of claim 7, wherein the interconnection test further comprises comparing the connection information with the network topology information to determine if the connection information matches the network topology information.

9. The system of claim 5, wherein the group of network tests further comprises an error rate test that comprises determining a rate of error for data provided along a first path of a plurality of paths connecting the at least two network devices.

10. The system of claim 9, wherein the error rate test further comprises performing a cyclic redundancy check (CRC) for data provided along the first path of the plurality of paths connecting the at least two network devices.

11. The system of claim 5, wherein the group of network tests further comprises a signal strength test that comprises obtaining information indicating a measured magnitude of a signal obtained at the at least two network devices.

12. The system of claim 11, wherein the plurality of network paths further include physical links comprising a fiber optic cable; and
wherein the measured magnitude further comprises a light level associated with the fiber optic cable.

13. A non-transitory computer-readable storage medium having stored thereon executable instructions that, as a result of being executed by one or more processors of a computer system, cause the computer system to at least:
determine at least one network test to perform of a set of network tests;
obtain network information indicating a plurality of network devices of a network, a first network device of the plurality of network devices including a plurality of network connections to a second network device of the plurality of network devices;
cause the at least one network test to be performed by the first network device;
obtain a result of the at least one network test from the first network device; and
validate at least a portion of a network topology associated with the network based at least in part on the result and based at least in part on neighbor information, the neighbor information obtained from the first network device and indicating the plurality of network connections between the first network device and the second network device.

14. The non-transitory computer-readable storage medium of claim 13, wherein the instructions that cause the computer system to determine the at least one network test to perform of the set of network tests further include instructions that cause the computer system to determine to execute a ping test.

15. The non-transitory computer-readable storage medium of claim 14, wherein the instructions that cause the computer system to cause the at least one network test to be performed by the first network device further include instructions that cause the computer system to cause the first network device to generate an amount of traffic between an interface of the first network device and the second network device over the plurality of network connections.

16. The non-transitory computer-readable storage medium of claim 13, wherein the instructions that cause the computer system to determine the at least one network test to perform of the set of network tests further include instructions that cause the computer system to determine to execute signal strength tests to determine a magnitude associated with the plurality of network connections.

17. The non-transitory computer-readable storage medium of claim 13, wherein the instructions that cause the computer system to validate the portion of the network topology further include instructions that cause the computer system to validate the network topology based at least in part on the result matching one or more parameters of the network indicated in the network topology.

18. The non-transitory computer-readable storage medium of claim 13, wherein the instructions further comprise instructions that, as a result of being executed by the one or more processors, cause the computer system to parse the result to obtain information associated with a first interface of the first network device and a second interface of the second network device.

19. The non-transitory computer-readable storage medium of claim 18, wherein the instructions that cause the computer system to validate the portion of the network topology further include instructions that cause the computer system to validate the network topology based at least in part on matching information obtained from the first interface and the second interface with information included in the network topology.

20. The non-transitory computer-readable storage medium of claim 13, wherein the instructions further comprise instructions that, as a result of being executed by the one or more processors, cause the computer system to obtain the neighbor information using Link Layer Discovery Protocol (LLDP).

* * * * *